(12) United States Patent
Pezeshki et al.

(10) Patent No.: US 12,432,738 B2
(45) Date of Patent: Sep. 30, 2025

(54) UE FEEDBACK OF CONTENT PROCESSING TIME FOR BI-DIRECTIONAL TRAFFIC

(71) Applicant: QUALCOMM Incorporated, San Diego, CA (US)

(72) Inventors: Hamed Pezeshki, San Diego, CA (US); Mahmoud Taherzadeh Boroujeni, San Diego, CA (US); Tao Luo, San Diego, CA (US); Konstantinos Dimou, New York, NY (US); Yan Zhou, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 18/176,946

(22) Filed: Mar. 1, 2023

(65) Prior Publication Data

US 2023/0209557 A1    Jun. 29, 2023

Related U.S. Application Data

(63) Continuation of application No. 17/070,744, filed on Oct. 14, 2020, now Pat. No. 11,611,981.

(30) Foreign Application Priority Data

Oct. 18, 2019   (GR) .............................. 20190100467

(51) Int. Cl.
*H04W 72/21*   (2023.01)
*H04W 72/1273*   (2023.01)
*H04W 72/23*   (2023.01)

(52) U.S. Cl.
CPC ....... *H04W 72/21* (2023.01); *H04W 72/1273* (2013.01); *H04W 72/23* (2023.01)

(58) Field of Classification Search
CPC . H04W 72/21; H04W 72/1273; H04W 72/23; H04L 5/0055; H04L 5/0007;
(Continued)

(56) References Cited

U.S. PATENT DOCUMENTS

2019/0007942 A1    1/2019  Takeda et al.
2019/0191429 A1*   6/2019  Stern-Berkowitz ... H04W 72/51
(Continued)

FOREIGN PATENT DOCUMENTS

CN       109688595 A    4/2019
EP         3606202 A1   2/2020
WO    WO2018170921 A1   9/2018

OTHER PUBLICATIONS

International Preliminary Report on Patentability—PCT/US2020/055708, The International Bureau of WIPO—Geneva, Switzerland, Apr. 28, 2022.
(Continued)

*Primary Examiner* — Sharmin Chowdhury
(74) *Attorney, Agent, or Firm* — Kevin M. Donnelly; Holland & Hart LLP

(57) ABSTRACT

Methods, systems, and devices for wireless communication are described. Generally, the described techniques provide for reporting content processing times to a base station to allow the base station to efficiently schedule bi-directional communications one or more UEs. A content processing time may correspond to the time taken by a UE to process one or more downlink signals received in one or more downlink transmissions. In some examples, the UE may report a content processing time for each downlink transmission. In some examples, the UE may report one or more content processing times for multiple downlink transmissions. The base station may use the content processing times to configure an appropriate gap between downlink and uplink transmissions such that the UE may have sufficient
(Continued)

time to process downlink signals before transmitting one or more uplink transmissions in response to the one or more downlink transmissions.

15 Claims, 15 Drawing Sheets

(58) Field of Classification Search
CPC ... H04L 5/0092; H04L 1/1854; H04L 1/1864; H04L 1/1671
See application file for complete search history.

(56) References Cited

U.S. PATENT DOCUMENTS

| | | |
|---|---|---|
| 2019/0289622 A1 | 9/2019 | Chatterjee et al. |
| 2020/0022151 A1 | 1/2020 | Zhou |
| 2020/0322971 A1 | 10/2020 | Jung et al. |
| 2020/0351214 A1* | 11/2020 | Jung .................. H04W 28/06 |
| 2021/0006375 A1* | 1/2021 | Takeda ................ H04W 72/04 |
| 2021/0120573 A1 | 4/2021 | Pezeshki et al. |
| 2021/0368534 A1 | 11/2021 | Sato et al. |
| 2022/0070900 A1 | 3/2022 | Yin |

OTHER PUBLICATIONS

International Search Report and Written Opinion—PCT/US2020/055708—ISA/EPO—Dec. 16, 2020.

* cited by examiner

UE FEEDBACK OF CONTENT PROCESSING TIME FOR BI-DIRECTIONAL TRAFFIC

CROSS REFERENCE

The present Application for Patent is a Continuation of U.S. patent application Ser. No. 17/070,744 by PEZESHKI et al., entitled "UE FEEDBACK OF CONTENT PROCESSING TIME FOR BI-DIRECTIONAL TRAFFIC" filed Oct. 14, 2020, which claims the benefit of Greece Provisional Patent Application No. 20190100467 by PEZESHKI et al., entitled "UE FEEDBACK OF CONTENT PROCESSING TIME FOR BI-DIRECTIONAL TRAFFIC," filed Oct. 18, 2019, assigned to the assignee hereof, and each of which is expressly incorporated by reference herein.

TECHNICAL FIELD

The following relates generally to wireless communications and more specifically to user equipment (UE) feedback of a content processing time for bi-directional traffic.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as UEs. In some cases, a base station may schedule bi-directional communications with a UE, where the base station may transmit downlink data to the UE, and the UE may transmit uplink data to the base station related to the downlink data. Some wireless communications systems may support bi-directional communications between a base station and a UE. Bi-directional communications may include downlink transmissions from a base station to a UE and uplink transmissions from the UE to the base station in response to the downlink transmissions. In bi-directional communications, uplink data in an uplink transmission may be generated based on some processing based on corresponding downlink data in a downlink transmission (for example, downlink data that precedes the uplink data). In some examples, however, uplink data to be transmitted by a UE to a base station in response to downlink data may be time-sensitive (or delay-sensitive), and it may be challenging for the base station to effectively schedule a downlink transmission of the downlink data to the UE and an uplink transmission of the uplink data from the UE

SUMMARY

The described techniques relate to improved methods, systems, devices, and apparatuses that support user equipment (UE) feedback of content processing time for bi-directional traffic. Generally, the described techniques provide for reporting content processing times to a base station to allow the base station to efficiently schedule bi-directional communications with a UE. In some examples, the UE may report a content processing time for each downlink transmission received from the base station. In some examples, the UE may report one or more content processing times for multiple downlink transmissions received from the base station. In some examples, the UE may report some statistics of the content processing times for multiple downlink transmissions from the base station. The base station may use the content processing times to configure an appropriate gap between downlink and uplink transmissions, such that the UE may have sufficient time to process one or more downlink signals in one or more downlink transmissions before transmitting one or more uplink transmissions in response to the one or more downlink transmissions.

One innovative aspect of the subject matter described in this disclosure can be implemented in a method for wireless communication. The method may include receiving one or more downlink transmissions from a base station, processing one or more downlink signals received in the one or more downlink transmissions, determining a content processing time associated with the UE processing of the one or more downlink signals, and transmitting an indication of the content processing time in one or more uplink transmissions to the base station.

An apparatus for wireless communication at a UE is described. The apparatus may include a processor, memory coupled with the processor, and instructions stored in the memory. The instructions may be executable by the processor to cause the apparatus to receive one or more downlink transmissions from a base station, process one or more downlink signals received in the one or more downlink transmissions, determine a content processing time associated with the UE processing of the one or more downlink signals, and transmit an indication of the content processing time in one or more uplink transmissions to the base station.

Another apparatus for wireless communication at a UE is described. The apparatus may include means for receiving one or more downlink transmissions from a base station, processing one or more downlink signals received in the one or more downlink transmissions, determining a content processing time associated with the UE processing of the one or more downlink signals, and transmitting an indication of the content processing time in one or more uplink transmissions to the base station.

A non-transitory computer-readable medium storing code for wireless communication at a UE is described. The code may include instructions executable by a processor to receive one or more downlink transmissions from a base station, process one or more downlink signals received in the one or more downlink transmissions, determine a content processing time associated with the UE processing of the one or more downlink signals, and transmit an indication of the content processing time in one or more uplink transmissions to the base station.

Some examples of the method, apparatuses, and non-transitory computer-readable medium described herein may further include operations, features, means, or instructions for receiving downlink control information scheduling each of the one or more downlink transmissions and each of the one or more uplink transmissions, each of the one or more uplink transmissions being in response to a respective downlink transmission of the one or more downlink transmissions, and transmitting the indication of the content processing time in the one or more uplink transmissions based on receiving the downlink control information.

In some examples of the method, apparatuses, and non-transitory computer-readable medium described herein, the one or more uplink transmissions include uplink control transmissions, and the indication of the content processing time may be transmitted in the one or more uplink transmissions with HARQ feedback for the one or more downlink transmissions. In some examples of the method, apparatuses, and non-transitory computer-readable medium described herein, the one or more uplink transmissions include uplink data transmissions, and the indication of the content processing time may be transmitted in the one or more uplink transmissions with uplink data in response to the one or more downlink transmissions.

Some examples of the method, apparatuses, and non-transitory computer-readable medium described herein may further include operations, features, means, or instructions for quantizing a duration of time to process the one or more downlink signals received in the one or more downlink transmissions to determine the content processing time, where transmitting the indication of the content processing time in the one or more uplink transmissions may be based on quantizing the time to process the one or more downlink signals. In some examples of the method, apparatuses, and non-transitory computer-readable medium described herein, quantizing the time to process the one or more downlink signals may include operations, features, means, or instructions for determining a number of slots or symbols to process the one or more downlink signals.

In some examples of the method, apparatuses, and non-transitory computer-readable medium described herein, the one or more downlink transmissions consist of a single downlink transmission, and determining the content processing time may include operations, features, means, or instructions for determining the content processing time based on a duration of time to process the single downlink transmission. In some examples of the method, apparatuses, and non-transitory computer-readable medium described herein, the one or more downlink transmissions consist of a set of downlink transmissions, and where determining the content processing time may include operations, features, means, or instructions for determining the content processing time based on a function of processing times to process the set of downlink transmissions.

In some examples of the method, apparatuses, and non-transitory computer-readable medium described herein, the function of the processing times includes a maximum or an average of the processing times to process the set of downlink transmissions. In some examples of the method, apparatuses, and non-transitory computer-readable medium described herein, the one or more downlink transmissions consist of a set of downlink transmissions, and where determining the content processing time may include operations, features, means, or instructions for determining a set of content processing times each corresponding to a duration of time to process a respective downlink transmission of the set of downlink transmissions, and where transmitting the indication of the content processing time includes, and transmitting indications of a subset of the set of content processing times in the one or more uplink transmissions.

In some examples of the method, apparatuses, and non-transitory computer-readable medium described herein, transmitting the indications of the subset of the set of content processing times may include operations, features, means, or instructions for transmitting indications of a top percentile of the set of content processing times, the top percentile being the subset of the set of content processing times. Some examples of the method, apparatuses, and non-transitory computer-readable medium described herein may further include operations, features, means, or instructions for receiving downlink control information configuring the UE to report the content processing time based on processing the single downlink transmission.

Some examples of the method, apparatuses, and non-transitory computer-readable medium described herein may further include operations, features, means, or instructions for receiving downlink control information configuring the UE to report the content processing time based on processing the set of downlink transmissions, where the reported content processing time may be based on statistics of a set of processing times to process the set of downlink transmissions. In some examples of the method, apparatuses, and non-transitory computer-readable medium described herein, the downlink control information further indicates one or more of a periodicity for reporting content processing times or parameters for reporting the content processing times.

In some examples of the method, apparatuses, and non-transitory computer-readable medium described herein, the parameters for reporting the content processing times include an indication of whether to report one or more of an average processing time, a maximum processing time, or a percentile of processing times to process the set of downlink transmissions. In some examples of the method, apparatuses, and non-transitory computer-readable medium described herein, the content processing time may be further associated with processing uplink signals for transmission in the one or more uplink transmissions.

Another innovative aspect of the subject matter described in this disclosure can be implemented in a method for wireless communication. The method may include transmitting one or more downlink transmissions to a UE, receiving, from the UE in one or more uplink transmissions, an indication of a content processing time associated with the UE processing one or more downlink signals transmitted in the one or more downlink transmissions, and transmitting downlink control information to the UE scheduling a downlink transmission and an uplink transmission in response to the downlink transmission based on the indication of the content processing time from the UE.

An apparatus for wireless communication at a base station is described. The apparatus may include a processor, memory coupled with the processor, and instructions stored in the memory. The instructions may be executable by the processor to cause the apparatus to transmit one or more downlink transmissions to a UE, receive, from the UE in one or more uplink transmissions, an indication of a content processing time associated with the UE processing one or more downlink signals transmitted in the one or more downlink transmissions, and transmit downlink control information to the UE scheduling a downlink transmission and an uplink transmission in response to the downlink transmission based on the indication of the content processing time from the UE.

Another apparatus for wireless communication at a base station is described. The apparatus may include means for transmitting one or more downlink transmissions to a UE, receiving, from the UE in one or more uplink transmissions, an indication of a content processing time associated with the UE processing one or more downlink signals transmitted in the one or more downlink transmissions, and transmitting downlink control information to the UE scheduling a downlink transmission and an uplink transmission in response to the downlink transmission based on the indication of the content processing time from the UE.

A non-transitory computer-readable medium storing code for wireless communication at a base station is described. The code may include instructions executable by a processor to transmit one or more downlink transmissions to a UE, receive, from the UE in one or more uplink transmissions, an indication of a content processing time associated with the UE processing one or more downlink signals transmitted in the one or more downlink transmissions, and transmit downlink control information to the UE scheduling a downlink transmission and an uplink transmission in response to the downlink transmission based on the indication of the content processing time from the UE.

Some examples of the method, apparatuses, and non-transitory computer-readable medium described herein may further include operations, features, means, or instructions for determining a duration of time between the downlink transmission and the uplink transmission to allocate to the UE for processing the one or more downlink signals in the downlink transmission based on the content processing time indicated by the UE, where transmitting the downlink control information to the UE scheduling the downlink transmission and the uplink transmission may be based on determining the time between the downlink transmission and the uplink transmission.

In some examples of the method, apparatuses, and non-transitory computer-readable medium described herein, the one or more uplink transmissions include uplink control transmissions, and the indication of the content processing time may be received in the one or more uplink transmissions with HARQ feedback for the one or more downlink transmissions. In some examples of the method, apparatuses, and non-transitory computer-readable medium described herein, the one or more uplink transmissions include uplink data transmissions, and the indication of the content processing time may be received in the one or more uplink transmissions with uplink data in response to the one or more downlink transmissions.

Some examples of the method, apparatuses, and non-transitory computer-readable medium described herein may further include operations, features, means, or instructions for receiving the indication of the content processing time based on the single downlink transmission. Some examples of the method, apparatuses, and non-transitory computer-readable medium described herein may further include operations, features, means, or instructions for receiving the indication of the content processing time based on the set of downlink transmissions. Some examples of the method, apparatuses, and non-transitory computer-readable medium described herein may further include operations, features, means, or instructions for receiving indications of a subset of a set of content processing times, each of the set of content processing times being based on a respective downlink transmission of the set of downlink transmissions.

Some examples of the method, apparatuses, and non-transitory computer-readable medium described herein may further include operations, features, means, or instructions for transmitting downlink control information configuring the UE to report the content processing time based on processing the single downlink transmission. Some examples of the method, apparatuses, and non-transitory computer-readable medium described herein may further include operations, features, means, or instructions for transmitting downlink control information configuring the UE to report the content processing time based on processing the set of downlink transmissions, where the reported content processing time may be based on statistics of a set of processing times to process the set of downlink transmissions.

In some examples of the method, apparatuses, and non-transitory computer-readable medium described herein, the downlink control information further indicates one or more of a periodicity for reporting content processing times or parameters for reporting the content processing times. In some examples of the method, apparatuses, and non-transitory computer-readable medium described herein, the parameters for reporting the content processing times include an indication of whether to report an average processing time, a maximum processing time, or a percentile of processing times to process the set of downlink transmissions. In some examples of the method, apparatuses, and non-transitory computer-readable medium described herein, the content processing time may be further associated with the UE processing uplink signals for transmission in the one or more uplink transmissions.

DETAILED DESCRIPTION

Figure 1:
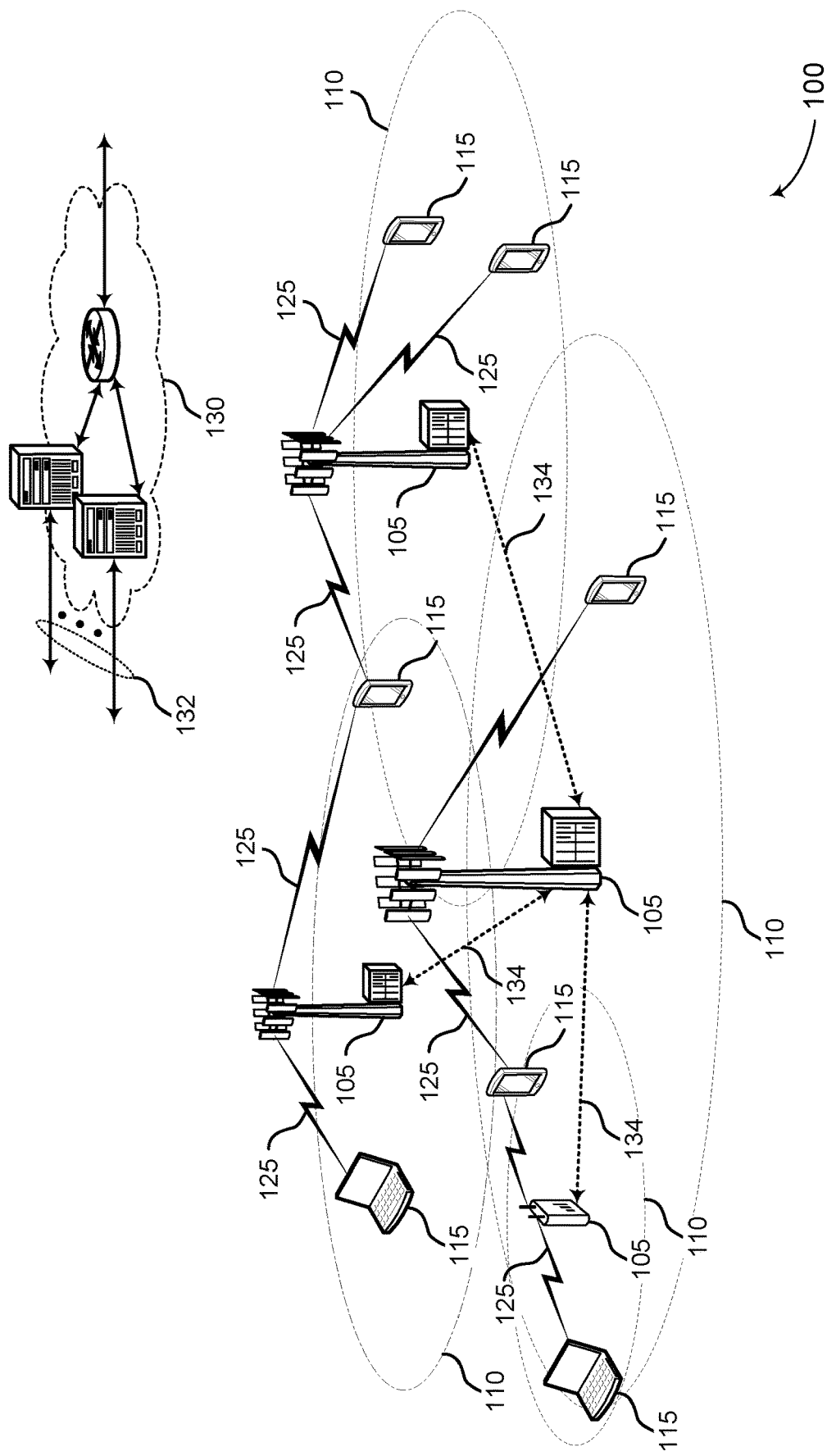
FIG. 1 illustrates an example of a wireless communications system that supports user equipment (UE) feedback of content processing time for bi-directional traffic in accordance with aspects of the present disclosure.

Some wireless communications systems may support bi-directional communications between a base station and a user equipment (UE). Bi-directional communications may include downlink transmissions from a base station to a UE and uplink transmissions from the UE to the base station in response to the downlink transmissions. In bi-directional communications, uplink data in an uplink transmission may be generated based on some processing based on corresponding downlink data in a downlink transmission (for example, downlink data that precedes the uplink data). In some examples, however, uplink data to be transmitted by a UE to a base station in response to downlink data may be time-sensitive (or delay-sensitive), and it may be challenging for the base station to effectively schedule a downlink transmission of the downlink data to the UE and an uplink transmission of the uplink data from the UE without more information. In particular, it may be challenging for the base station to minimize the gap between the downlink transmission and the uplink transmission while also providing sufficient time for the UE to process the downlink data in the downlink transmission.

As described herein, a wireless communications system may support efficient techniques for enabling a base station to efficiently schedule bi-directional communications with a UE. The UE may report one or more content processing times to the base station and the base station may use the content processing times to efficiently schedule bi-directional communications with the UE, among other devices. A content processing time may correspond to the time taken by a UE to process downlink signals received in a downlink transmission from a base station. In some examples, the UE may process the downlink signals received in a physical downlink shared channel (PDSCH), and the UE may determine the time taken to process (e.g., demodulate, decode, or the like) the downlink signals received in the PDSCH (for example, the content processing time). In some examples, the UE may report a content processing time for each downlink transmission received from the base station. In some examples, the UE may report one or more content processing times for multiple downlink transmissions received from the base station. The base station may then use the content processing times to schedule bi-directional communications with the UE such that the UE may have sufficient time to process downlink transmissions received from the base station before transmitting uplink transmissions to the base station in response to the downlink transmissions.

Because the base station may receive reports of the content processing times taken by a UE to process downlink signals transmitted to the UE, the base station may be able to configure an appropriate gap between one or more downlink transmissions and one or more uplink transmissions. As a result, the UE may be more likely to finish processing downlink signals in the downlink transmission before the uplink transmission, and the UE may be less likely to miss the uplink transmission. Further, the gap between the downlink transmission and the uplink transmission may be minimized (for example, while still providing sufficient time for the UE to process the downlink signals), and the latency associated with the uplink transmission may be minimized. Thus, using the techniques described herein, a wireless system may be able to increase throughput and decrease latency associated with bi-directional communications associated with other techniques or systems.

Aspects of the disclosure introduced above are described below in the context of a wireless communications system. Examples of processes and signaling exchanges that support UE feedback of content processing time for bi-directional traffic are then described. Aspects of the disclosure are further illustrated by and described with reference to apparatus diagrams, system diagrams, and flowcharts that relate to UE feedback of content processing time for bi-directional traffic.

FIG. 1 illustrates an example of a wireless communications system 100 that supports UE feedback of content processing time for bi-directional traffic in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

The base stations 105 may wirelessly communicate with the UEs 115 via one or more base station antennas. The base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, or relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (for example, in a physical uplink control channel (PUCCH) or a physical uplink shared channel (PUSCH)), or downlink transmissions from a base station 105 to a UE 115 (for example, in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)) and may be positioned according to a channel raster for discovery by the UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or other examples, which may be implemented in various articles such as appliances, vehicles, meters, or other examples.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for the UEs 115 include entering a power saving "deep sleep" mode when not engaging in active communications, or operating over a limited bandwidth (for example, according to narrowband communications). In some examples, the UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of the UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

Base stations 105 may communicate with the core network 130 and with one another. For example, the base stations 105 may interface with the core network 130 through backhaul links 132 (for example, via an S1, N2, N3, or other interface). The base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for the UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with the UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to the UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between the UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as the base stations 105 and the UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, the base station 105 or the UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some examples, the antennas of a base station 105 or a UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, the UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some examples, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

The wireless communications system 100 may support bi-directional communications between a base station 105 and a UE 115, among other devices. Bi-directional communications may include downlink transmissions from a base station 105 to a UE 115 and uplink transmissions from the UE 115 to the base station 105 in response to the downlink transmissions. In such communications, uplink data in an uplink transmission may be generated based on some processing performed on related or corresponding downlink data in a downlink transmission (for example, downlink data that precedes the uplink data). In some examples, however, uplink data to be transmitted in response to downlink data may be time-sensitive (or delay-sensitive), and it may be challenging for a base station 105 to schedule a downlink transmission of the downlink data and an uplink transmission of the uplink data. In particular, it may be challenging for the base station 105 to minimize the gap between the downlink transmission and the uplink transmission and still provide sufficient time for the UE 115 to process the downlink data in the downlink transmission.

As an example, a base station 105 may schedule a downlink and uplink transmission for bi-directional communications, a UE 115 may report an indication of a timing (for example, K2 timing) from an uplink grant in a control channel to an uplink data transmission in a data channel, and a base station 105 may schedule uplink transmissions from the UE 115 based on the indicated timing. The timing value, however, may be based on hardware capabilities of the UE 115 and may not be based on actual processing times taken to process downlink signals received from a base station or uplink signals for transmission to a base station. The timing value may also be based on communication related capabilities of the UE 115, including scrambling (or de-scrambling), interleaving (or de-interleaving), among other examples, and the timing value may not accurately reflect signal processing capabilities. Further, the timing value may not consider the case where downlink and uplink data are correlated (for example, bi-directional communications).

Thus, the use of the timing value in other techniques described above to configure a gap between a downlink transmission and an uplink transmission for bi-directional communications may be deficient. Specifically, if the gap between a downlink transmission and an uplink transmission is too short, a UE 115 may not be able to process downlink signals in the downlink transmission before the uplink transmission, and the UE 115 may miss the uplink transmission. Alternatively, if the gap between a downlink transmission and an uplink transmission is too long, the latency associated with the uplink transmission may be high.

The wireless communications system 100 supports efficient techniques for enabling a base station 105 to more efficiently schedule bi-directional communications with a UE 115. In particular, a UE 115 may report content processing times to a base station 105, and the base station 105 may use the content processing times to schedule bi-directional communications with the UE 115. Accordingly, the base station 105 may be able to adjust or account for the different (for example, higher or lower) content processing times of different UEs 115 when scheduling bi-directional communications with the UEs 115. That is, the content processing time feedback may help the base station 105 to determine the time between downlink scheduling assignments and uplink scheduling grants for different UEs 115.

Figure 2:
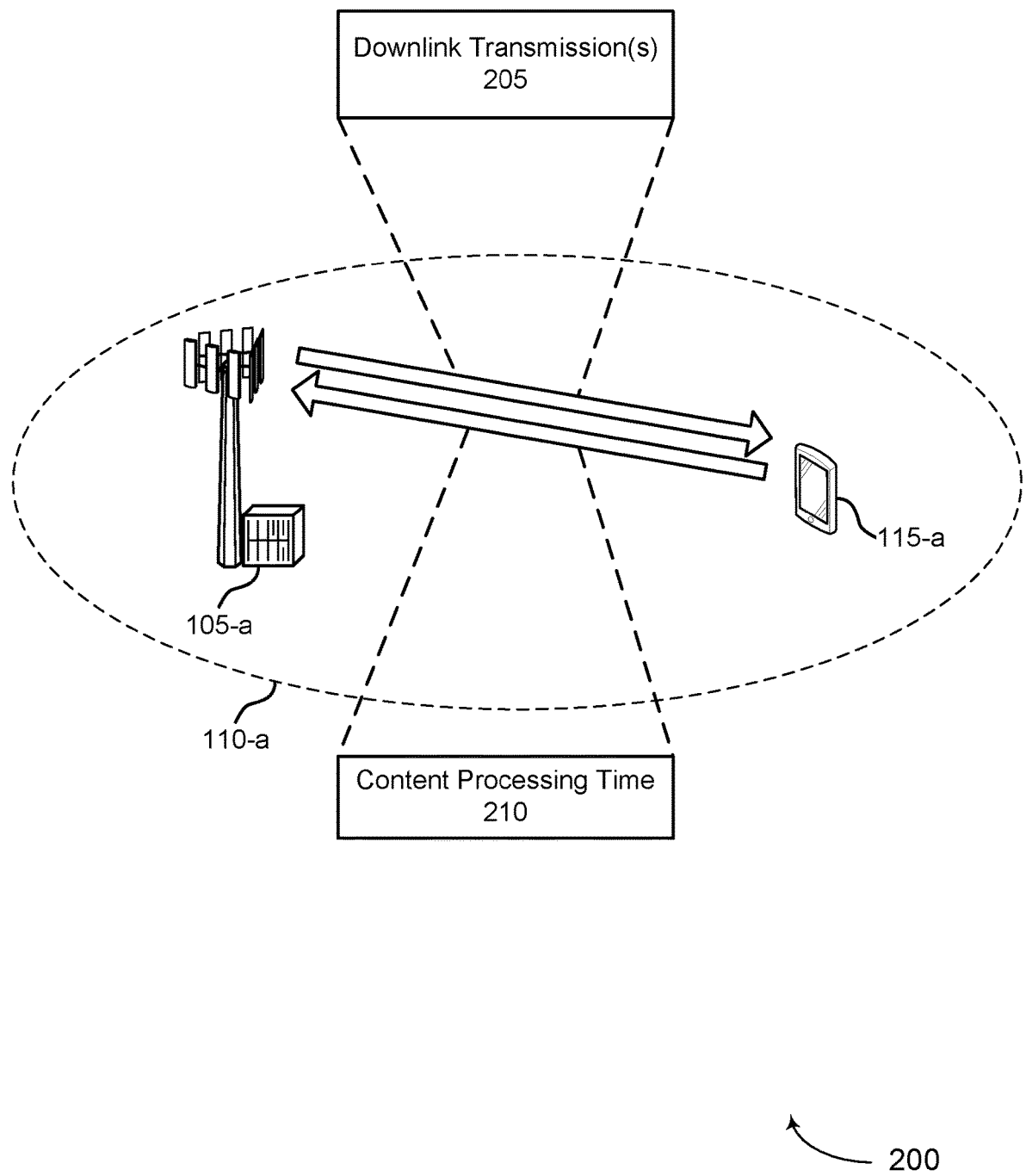
FIG. 2 illustrates an example of a wireless communications system that supports UE feedback of content processing time for bi-directional traffic in accordance with aspects of the present disclosure.

FIG. 2 illustrates an example of a wireless communications system 200 that supports UE feedback of content processing time for bi-directional traffic in accordance with aspects of the present disclosure. The wireless communications system 200 may include a UE 115-*a*, which may be an example of a UE 115 described with reference to FIG. 1. The wireless communications system 200 may also include a base station 105-*a*, which may be an example of a base station 105 described with reference to FIG. 1. The base station 105-*a* may provide communication coverage for a coverage area 110-*a*. The wireless communications system 200 may implement aspects of wireless communications system 100. For example, the wireless communications system 200 may support efficient techniques for enabling the base station 105-*a* to efficiently schedule bi-directional communications with the UE 115-*a*.

Specifically, the UE 115-*a* may report content processing times to a base station 105-*a*, and the base station 105-*a* may use the content processing times to efficiently schedule bi-directional communications with the UE 115-*a*. As described with reference to FIG. 2, the base station 105-*a* may transmit one or more downlink transmissions 205 to the UE 115-*a*. The UE 115-*a* may receive and process the downlink signals in the downlink transmissions 205 and may determine the time taken to process the downlink signals in each of the one or more downlink transmissions 205. The time taken to process downlink signals received in a downlink transmission may be referred to as the content processing time. The UE 115-*a* may then report at least one content processing time 210 to the base station 105-*a* based on the content processing times determined for the one or more downlink transmissions 205, and the base station 105-*a* may use the at least one content processing time 210 to schedule subsequent bi-directional communications with the UE 115-*a*.

In some implementations, the UE 115-*a* may be configured for short-term reporting of content processing times, and the UE 115-*a* may report a content processing time 210 for each of the downlink transmissions 205 received from the base station 105-*a*. In other implementations, the UE 115-*a* may be configured for long-term reporting of content processing times, and the UE 115-*a* may report a content processing time 210 for multiple downlink transmissions 205 received from the base station 105-*a*. Thus, the at least one content processing time 210 may be the duration of time taken to process downlink signals in a single downlink transmission, or the at least one content processing time 210 may be some function or statistic (for example, maximum, average, or top percentile) of the durations of time taken to process downlink signals in multiple downlink transmissions.

Figure 3:
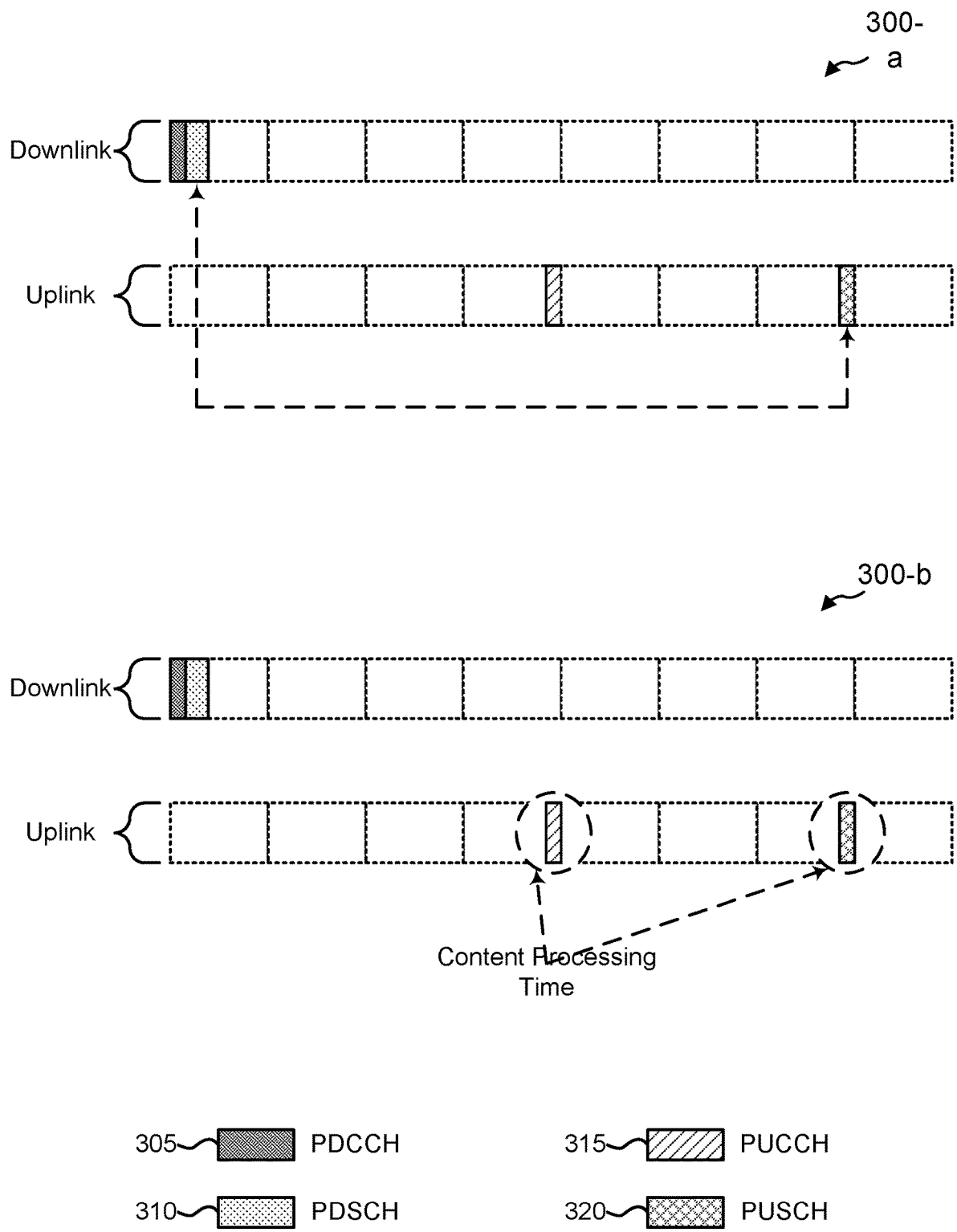
FIG. 3 illustrates an example of UE feedback of content processing time for bi-directional traffic in accordance with aspects of the present disclosure.

FIG. 3 illustrates an example of UE feedback 300 of content processing time for bi-directional traffic in accordance with aspects of the present disclosure. In the example of FIG. 3, a UE 115 may be scheduled for bi-directional communications with a base station 105. In particular, the base station 105 may transmit a downlink grant and an uplink grant, for example in a PDCCH 305, scheduling a downlink data transmission, for example in a PDSCH 310, an uplink control transmission of feedback (for example, HARQ feedback) in a PUCCH 315 as one example, and an uplink data transmission in a PUSCH 320 as one example. As illustrated in the example 300-*a*, the uplink data transmission in the PUSCH 320 may be in response to the downlink data transmission in the PDSCH 310. That is, the UE 115 may have to process the downlink data in the PDSCH 310 before transmitting the uplink data in the PUSCH 320.

In accordance with the techniques described herein, the UE 115 may process the downlink signals received in the PDSCH 310, and the UE 115 may determine the time taken to process the downlink signals received in the PDSCH 310 (for example, the content processing time). As illustrated in example 300-*b*, the UE 115 may then report the content processing time to the base station 105, for example, in the PUCCH or the PUSCH. If the UE 115 determines to (or is configured to) report the content processing time to the base station 105, for example in the PUCCH, the UE 115 may transmit the indication of the content processing time along with HARQ feedback in the PUCCH 315.

Alternatively, if the UE 115 determines to (or is configured to) report the content processing time to the base station 105, for example in the PUSCH 320, the UE 115 may transmit the indication of the content processing time along with uplink data in the PUSCH 320. In some examples, the content processing time may include the time taken to process the uplink signals for transmission in the PUCCH 315 or the PUSCH 320 (for example, in addition to the time taken to process the downlink signals received in the PDSCH 310).

Figure 4:
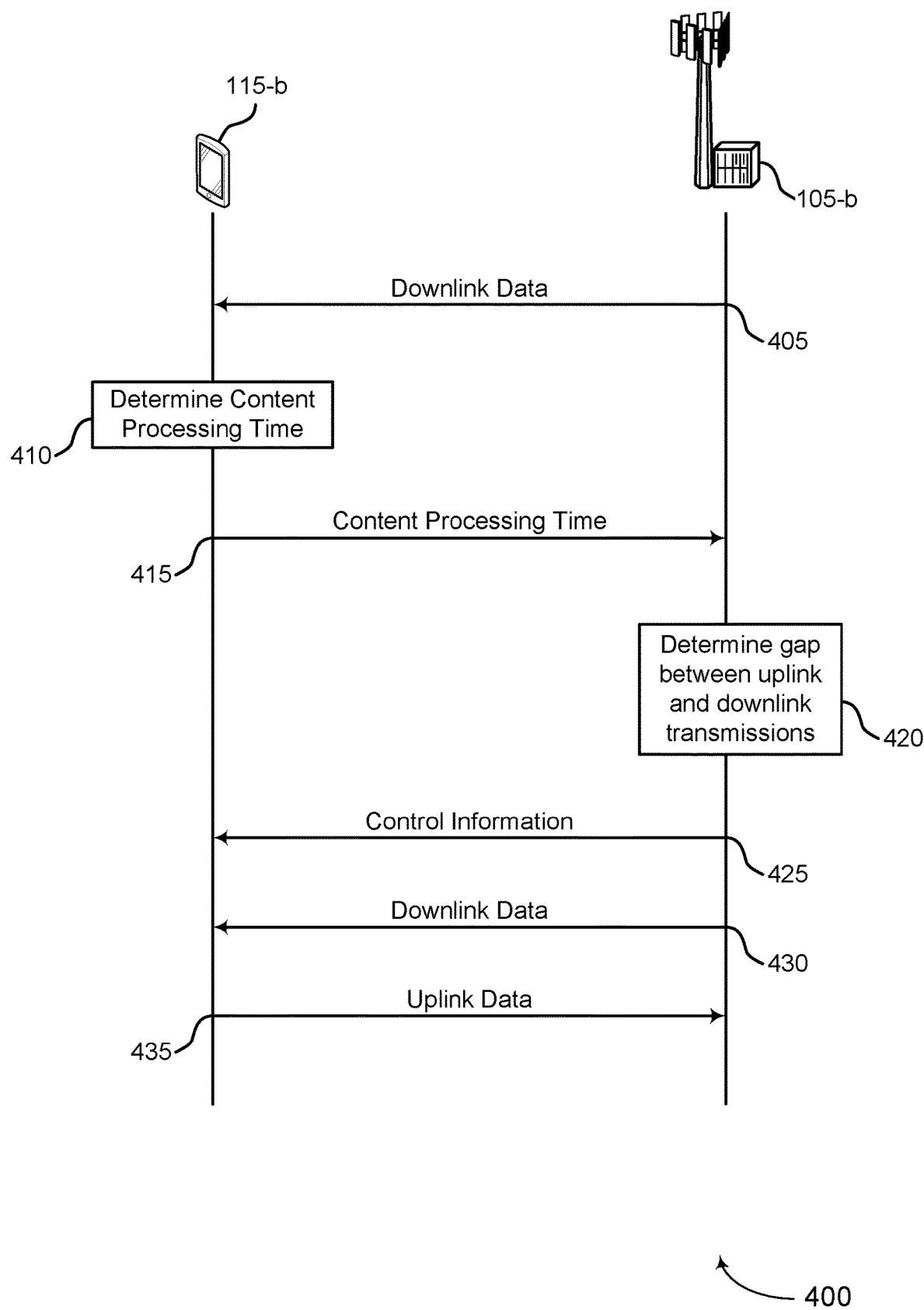
FIG. 4 illustrates an example of a process flow that supports UE feedback of content processing time for bi-directional traffic in accordance with aspects of the present disclosure.

FIG. 4 illustrates an example of a process flow 400 that supports UE feedback of content processing time for bi-directional traffic in accordance with aspects of the present disclosure. The process flow 400 illustrates aspects of techniques performed by a UE 115-b, which may be an example of a UE 115 described with reference to FIGS. 1-3. The process flow 400 also illustrates aspects of techniques performed by a base station 105-b, which may be an example of a base station 105 described with reference to FIGS. 1-3. As described herein, process flow 400 may support efficient techniques for enabling a base station 105-b to efficiently schedule bi-directional communications with the UE 115-b.

In the example of FIG. 4, the UE 115-b may be configured to report a content processing time for each downlink transmission received from the base station 105-b (for example, short-term reporting). For example, the UE 115-b may receive a configuration message indicating that the UE 115-b is to report a content processing time for each downlink transmission received from the base station 105-b (for example, the duration of time taken to process the downlink data in each downlink transmission received from the base station 105-b). The UE 115-b may receive the configuration message in dynamic signaling (for example, a downlink control information (DCI) message, such as the DCI used to schedule the downlink transmission for which the content processing time is being reported) or semi-static signaling (for example, in a MAC control element (MAC-CE) or in RRC signaling). In some examples, the base station 105-b may use the configuration message to change the report setting of the content processing time (for example, from long-term reporting to short-term reporting). Further, the configuration message may indicate or change other parameters for reporting content processing times (for example, the parameters to be reported).

At 405, the base station 105-b may transmit downlink data to the UE 115-b in a downlink transmission. At 410, the UE 115-b may process the downlink data (for example, one or more downlink signals) in the downlink transmission and determine the content processing time taken to process the downlink data. In some examples, the UE 115-b may quantize the content processing time and report the content processing time in terms of the number of slots, symbols, or some other quantized value.

At 420, the base station 105-b may determine to schedule subsequent bi-directional communications with the UE 115-b, and the base station 105-b may use the content processing time received at 415 to determine a gap to configure between a downlink transmission and an uplink transmission in the bi-directional communications. At 425, the base station 105-b may transmit control information to the UE 115-b scheduling the uplink and downlink transmission based on the determined gap. Then, at 430, the base station 105-b may transmit downlink data to the UE 115-b, and, at 435, the UE 115-b may transmit uplink data to the base station 105-b in response to the downlink data after the gap. In some examples, the content processing time received at 415 may include the content process time for a single downlink transmission. In some examples, the content processing time received at 415 may include the content process time for two or more downlink transmissions. In some examples, a content process time is communicated over one or more uplink transmissions for each downlink transmission. In some examples, a content process time communicated over one or more uplink transmissions may corresponds to one or more downlink transmissions.

Figure 5:
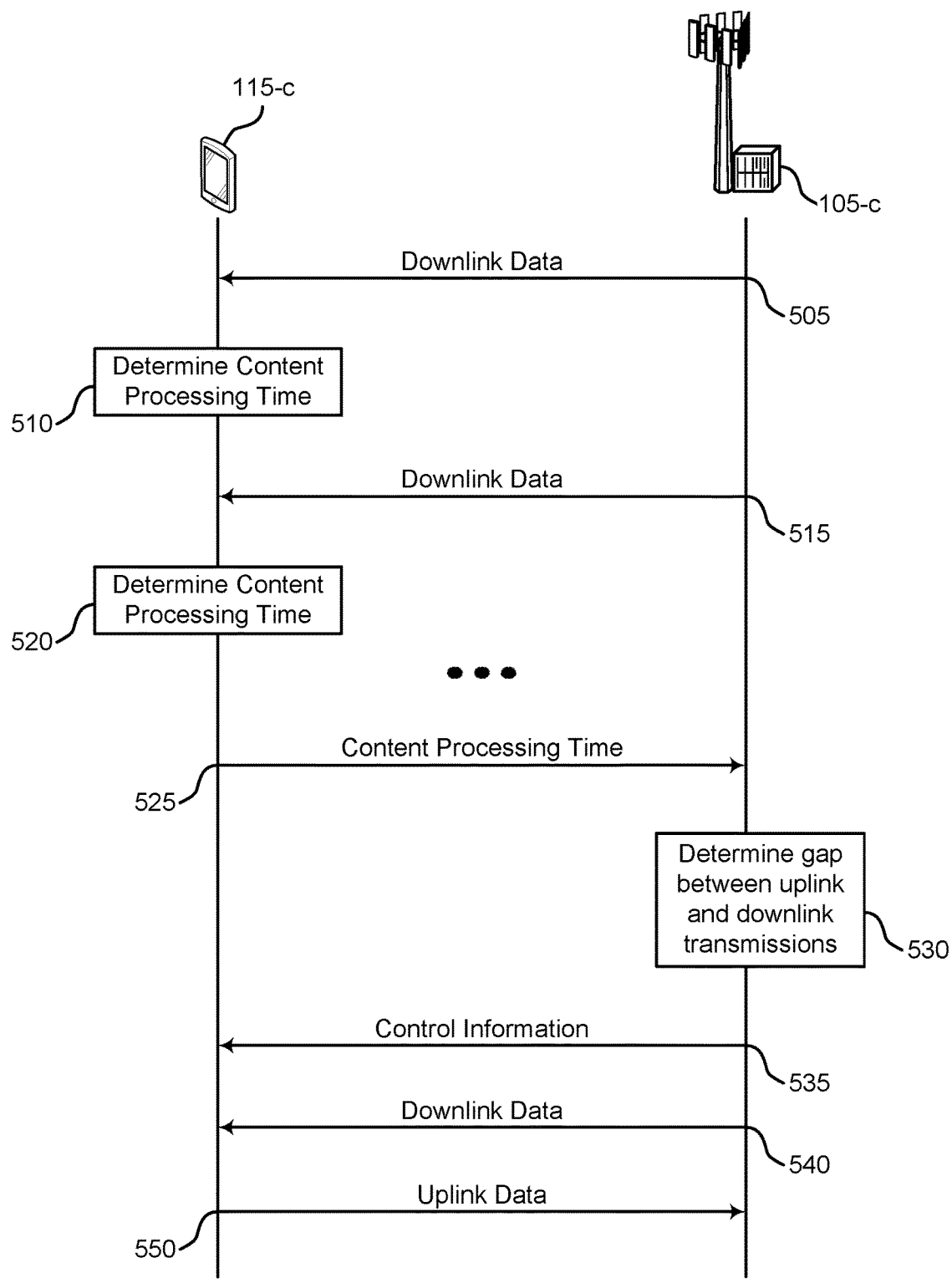
FIG. 5 illustrates an example of a process flow that supports UE feedback of content processing time for bi-directional traffic in accordance with aspects of the present disclosure.

FIG. 5 illustrates an example of a process flow 500 that supports UE feedback of content processing time for bi-directional traffic in accordance with aspects of the present disclosure. The process flow 500 illustrates aspects of techniques performed by a UE 115-c, which may be an example of a UE 115 described with reference to FIGS. 1-4. The process flow 500 also illustrates aspects of techniques performed by a base station 105-c, which may be an example of a base station 105 described with reference to FIGS. 1-4. As described herein, process flow 500 may support efficient techniques for enabling a base station 105-c to efficiently schedule bi-directional communications with the UE 115-c.

In the example of FIG. 5, the UE 115-c may be configured to report a content processing time for multiple downlink transmissions received from the base station 105-c (for example, long-term reporting). For example, the UE 115-c may receive a configuration message indicating that the UE 115-c is to report a single content processing time based on multiple downlink transmissions received from the base station 105-c (for example, based on the durations of time taken to process the downlink data in each of the multiple downlink transmissions received from the base station 105-c).

The UE 115-c may receive the configuration message in dynamic signaling (for example, a DCI message, such as the DCI used to schedule the first downlink transmission of the multiple downlink transmissions for which the content processing time is being reported) or semi-static signaling (for example, in a MAC-CE or in RRC signaling). In some examples, the base station 105-c may use the configuration message to change the report setting of the content processing time (for example, from long-term reporting to short-term reporting). Further, the configuration message may indicate or change other parameters for reporting content processing times, such as the periodicity for reporting content processing times (for example, where the periodicity is specified by a duration of time or by the number of downlink transmissions for which a content processing time is to be reported).

At 505, the base station 105-c may transmit first downlink data to the UE 115-c in a first downlink transmission. At 510, the UE 115-c may process the first downlink data (for example, one or more downlink signals) in the first downlink transmission and determine the content processing time taken to process the first downlink data. At 515, the base station 105-c may then transmit second downlink data to the UE 115-c in a second downlink transmission.

At 520, the UE 115-c may process the second downlink data (for example, one or more downlink signals) in the second downlink transmission and determine the content processing time taken to process the second downlink data. The base station 105-c may transmit further data in subsequent data transmissions to the UE 115-c, and the UE 115-c may determine the content processing times for each of the data transmissions until the UE 115-c determines the content processing time of a last data transmission before the UE 115-c is configured to report a content processing time to the base station 105-c (for example, based on the periodicity indicated in the configuration message described above).

At 525, the UE 115-c may then report at least one content processing time to the base station 105-c based on the content processing times determined for the multiple data transmissions received from the base station 105-c.

In some examples, the UE 115-c may be configured to report a single content processing time to the base station 105-c based on the content processing times determined for the multiple data transmissions received from the base station 105-c. Thus, the UE 115-c may determine the at least one content processing time to report based on a function of the content processing times determined for the multiple data transmissions.

For example, the UE 115-c may report the maximum or the average of the content processing times determined for the multiple data transmissions. The configuration message described herein may indicate whether the UE 115-c is to report the maximum or the average of the content processing times determined for the multiple data transmissions. In some examples, the UE 115-c may quantize the content processing times determined for the multiple data transmissions (for example, determine each content processing time in terms of a number of slots, symbols, or some other quantized value), and the UE 115-c may report a maximum of the quantized content processing times or an average of the quantized content processing times, among other examples.

In some examples, the UE 115-c may be configured to report a subset of the content processing times determined for the multiple data transmissions received from the base station 105-c. Thus, the UE 115-c may determine the subset of content processing times to report based on some statistics associated with the content processing times determined for the multiple data transmissions. For example, the UE 115-c may be configured to report a top percentile (for example, top N values) of the content processing times (for example, some percentage of the longest content processing times), and the UE 115-c may report the top percentile of the content processing times to the base station 105-c. In this example, the configuration message described above may indicate that the UE 115-c is to report the top percentile of the content processing times determined for the multiple data transmissions, and the configuration message may indicate the percentage of the top percentile and the criteria for the top percentile (for example, longest content processing times). In some examples, the UE 115-c may quantize the content processing times determined for the multiple data transmissions, and the UE 115-c may report the subset of the quantized content processing times.

At 530, the base station 105-c may determine to schedule subsequent bi-directional communications with the UE 115-c, and base station 105-b may use the at least one content processing time received at 525 to determine a gap to configure between a downlink transmission and an uplink transmission in the bi-directional communications. At 535, the base station 105-c may transmit control information to the UE 115-c scheduling the uplink and downlink transmission based on the determined gap. Then, at 540, the base station 105-c may transmit downlink data to the UE 115-c, and, at 550, the UE 115-c may transmit uplink data to the base station 105-c in response to the downlink data after the gap.

Figure 6:
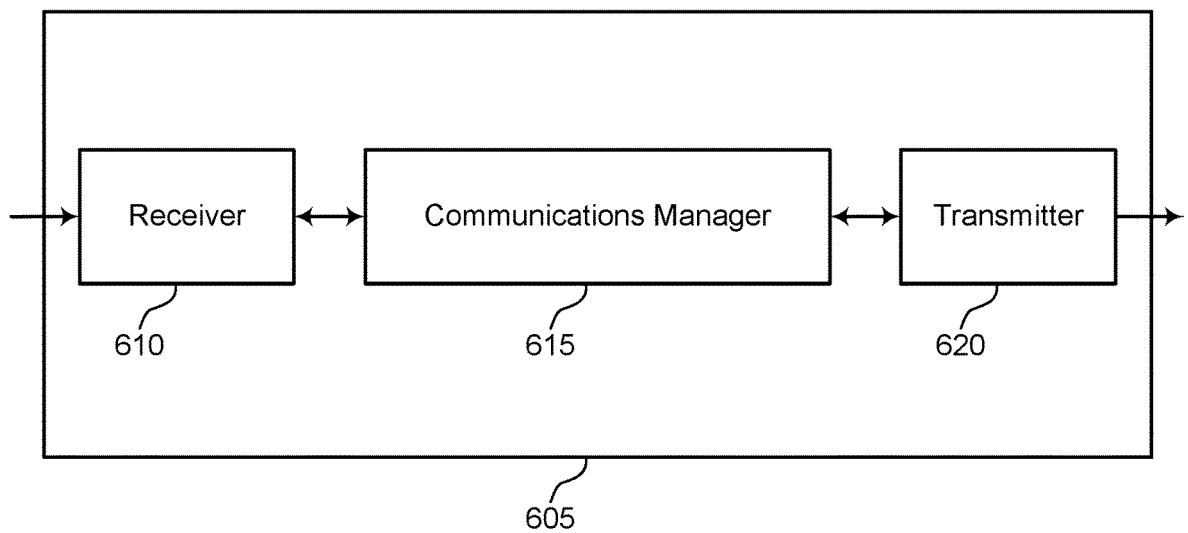
FIGS. 6 and 7 show block diagrams of devices that support UE feedback of content processing time for bi-directional traffic in accordance with aspects of the present disclosure.

FIG. 6 shows a block diagram of a device 605 that supports UE feedback of content processing time for bi-directional traffic in accordance with aspects of the present disclosure. The device 605 may be an example of aspects of a UE 115 as described herein. The device 605 may include a receiver 610, a communications manager 615, and a transmitter 620. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to UE feedback of content processing time for bi-directional traffic, among other examples). Information may be passed on to other components of the device 605. The receiver 610 may be an example of aspects of the transceiver 920 described with reference to FIG. 9. The receiver 610 may utilize a single antenna or a set of antennas.

The communications manager 615 may receive one or more downlink transmissions from a base station and may process one or more downlink signals received in the one or more downlink transmissions. The communications manager 615 may determine a content processing time associated with the UE processing of the one or more downlink signals and may transmit an indication of the content processing time in one or more uplink transmissions to the base station.

The communications manager 615, or its sub-components, may be implemented in hardware, code (for example, software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at different locations, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
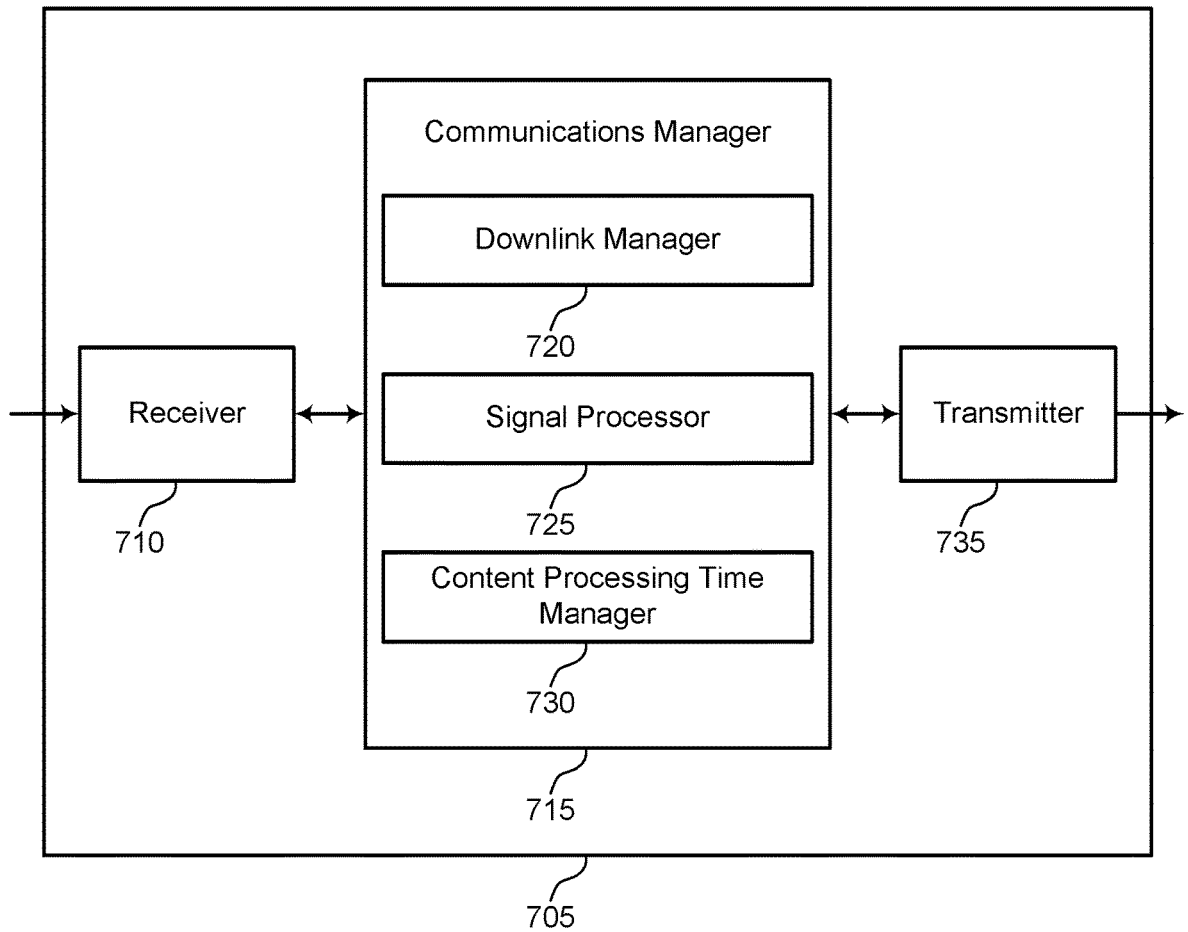

FIG. 7 shows a block diagram of a device 705 that supports UE feedback of content processing time for bi-directional traffic in accordance with aspects of the present disclosure. The device 705 may be an example of aspects of a device 605, or a UE 115 as described herein. The device 705 may include a receiver 710, a communications manager 715, and a transmitter 735. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to UE feedback of content processing time for bi-directional traffic, among other examples). Information may be passed on to other components of the device 705. The receiver 710 may be an example of aspects of the transceiver 920 described with reference to FIG. 9. The receiver 710 may utilize a single antenna or a set of antennas.

The communications manager 715 may include a downlink manager 720, a signal processor 725, and a content processing time manager 730.

The downlink manager 720 may receive one or more downlink transmissions from a base station. The signal processor 725 may process one or more downlink signals received in the one or more downlink transmissions. The content processing time manager 730 may determine a content processing time associated with the UE processing of the one or more downlink signals and transmit an indication of the content processing time in one or more uplink transmissions to the base station.

The transmitter 735 may transmit signals generated by other components of the device 705. In some examples, the transmitter 735 may be collocated with a receiver 710 in a transceiver component. For example, the transmitter 735 may be an example of aspects of the transceiver 920 described with reference to FIG. 9. The transmitter 735 may utilize a single antenna or a set of antennas.

Figure 8:
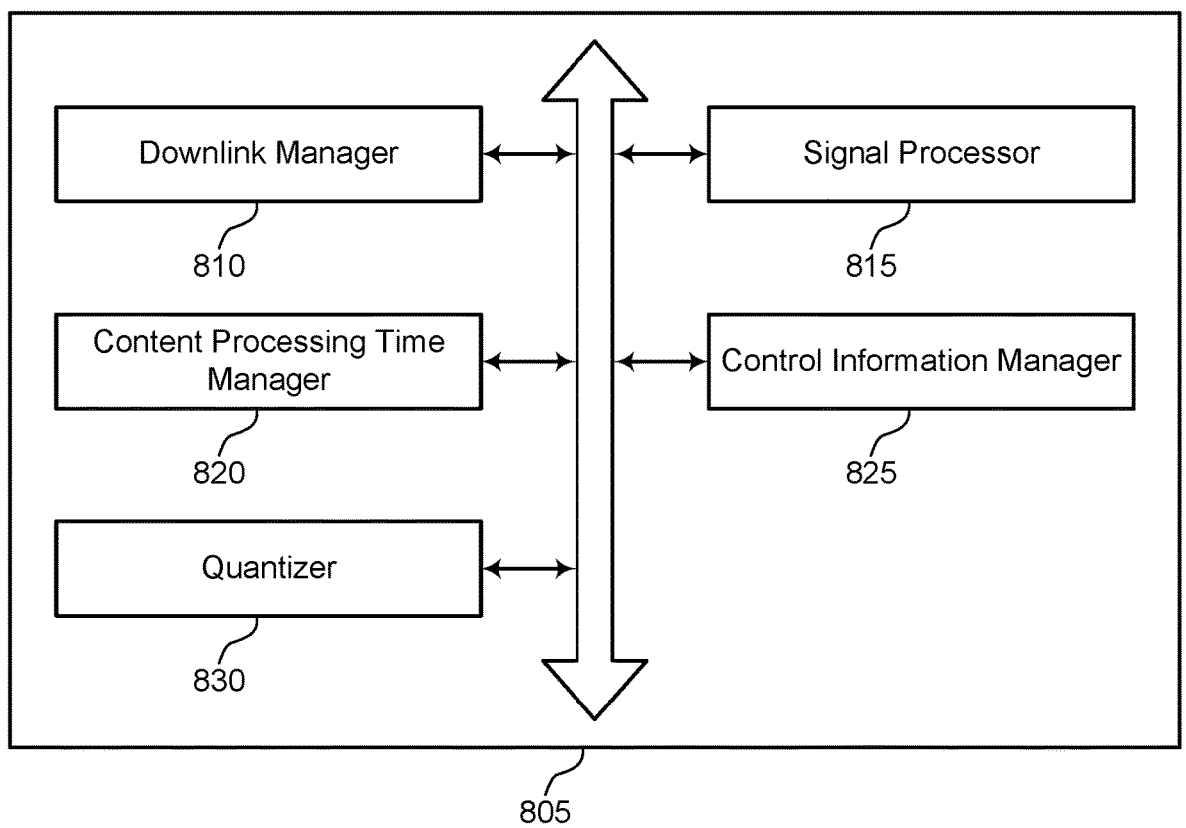
FIG. 8 shows a block diagram of a communications manager that supports UE feedback of content processing time for bi-directional traffic in accordance with aspects of the present disclosure.

FIG. 8 shows a block diagram of a communications manager 805 that supports UE feedback of content processing time for bi-directional traffic in accordance with aspects of the present disclosure. The communications manager 805 may include a downlink manager 810, a signal processor 815, a content processing time manager 820, a control information manager 825, and a quantizer 830. Each of these components may communicate, directly or indirectly, with one another (for example, via one or more buses).

The downlink manager 810 may receive one or more downlink transmissions from a base station. The signal processor 815 may process one or more downlink signals received in the one or more downlink transmissions. The content processing time manager 820 may determine a content processing time associated with the UE processing of the one or more downlink signals, and the content processing time manager 820 may transmit an indication of the content processing time in one or more uplink transmissions to the base station.

The control information manager 825 may receive downlink control information scheduling each of the one or more downlink transmissions and each of the one or more uplink transmissions, each of the one or more uplink transmissions being in response to a respective downlink transmission of the one or more downlink transmissions. In some examples, the content processing time manager 820 may transmit the indication of the content processing time in the one or more uplink transmissions based on receiving the downlink control information.

In some examples, the one or more uplink transmissions include uplink control transmissions. In some examples, the indication of the content processing time is transmitted in the one or more uplink transmissions with HARQ feedback for the one or more downlink transmissions. In some examples, the one or more uplink transmissions include uplink data transmissions. In some examples, the indication of the content processing time is transmitted in the one or more uplink transmissions with uplink data in response to the one or more downlink transmissions.

The quantizer 830 may quantize a duration of time to process the one or more downlink signals received in the one or more downlink transmissions to determine the content processing time, where transmitting the indication of the content processing time in the one or more uplink transmissions is based on quantizing the time to process the one or more downlink signals. In some examples, the quantizer 830 may determine a number of slots or symbols to process the one or more downlink signals.

In some examples, the content processing time manager 820 may determine the content processing time based on a duration of time to process the single downlink transmission. In some examples, the content processing time manager 820 may determine the content processing time based on a function of processing times to process the set of downlink transmissions. In some examples, the function of the processing times includes a maximum or an average of the processing times to process the set of downlink transmissions.

In some examples, determining a set of content processing times each corresponding to a duration of time to process a respective downlink transmission of the set of downlink transmissions, and the content processing time manager 820 may transmit indications of a subset of the set of content processing times. In some examples, the content processing time manager 820 may transmit indications of a top percentile of the set of content processing times, the top percentile being the subset of the set of content processing times.

In some examples, the control information manager 825 may receive downlink control information configuring the UE to report the content processing time based on processing the single downlink transmission. In some examples, the control information manager 825 may receive downlink control information configuring the UE to report the content processing time based on processing the set of downlink transmissions, where the reported content processing time is based on statistics of a set of processing times to process the set of downlink transmissions. In some examples, the downlink control information further indicates one or more of a periodicity for reporting content processing times or parameters for reporting the content processing times. In some examples, the parameters for reporting the content processing times include an indication of whether to report one or more of an average processing time, a maximum processing time, or a percentile of processing times to process the set of downlink transmissions. In some examples, the content processing time is further associated with processing uplink signals for transmission in the one or more uplink transmissions.

Figure 9:
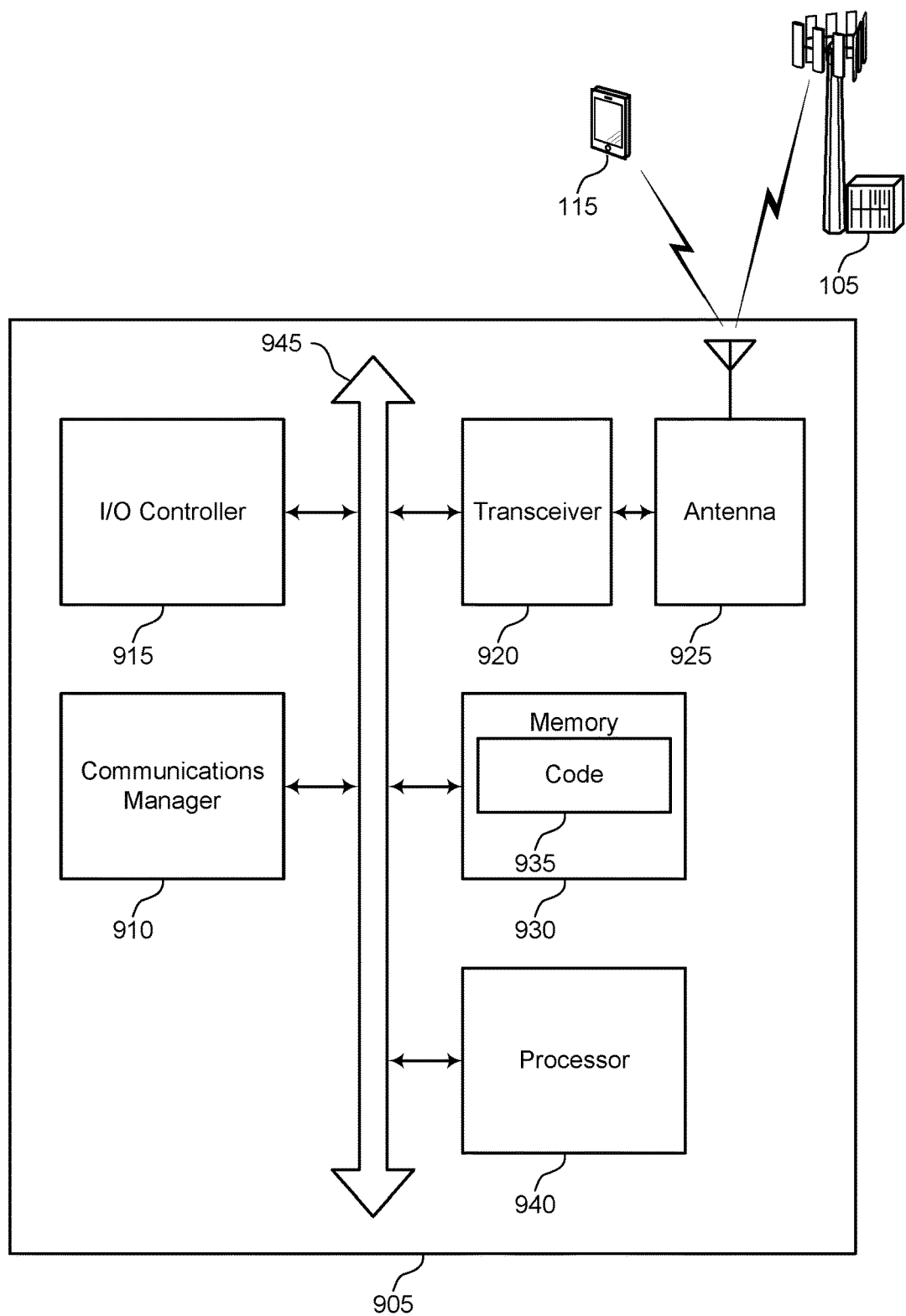
FIG. 9 shows a diagram of a system including a device that supports UE feedback of content processing time for bi-directional traffic in accordance with aspects of the present disclosure.

FIG. 9 shows a diagram of a system including a device 905 that supports UE feedback of content processing time for bi-directional traffic in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945).

The communications manager 910 may receive one or more downlink transmissions from a base station. The communications manager 910 may process one or more downlink signals received in the one or more downlink transmissions. The communications manager 910 may determine a content processing time associated with the UE processing of the one or more downlink signals. The communications manager 910 may transmit an indication of the content processing time in one or more uplink transmissions to the base station.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some examples, the memory 930 may contain, among other things, a BIOS which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (for example, the memory 930) to cause the device 905 to perform various functions (for example, functions or tasks supporting UE feedback of content processing time for bi-directional traffic).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, when compiled and executed) to perform functions described herein.

Figure 10:
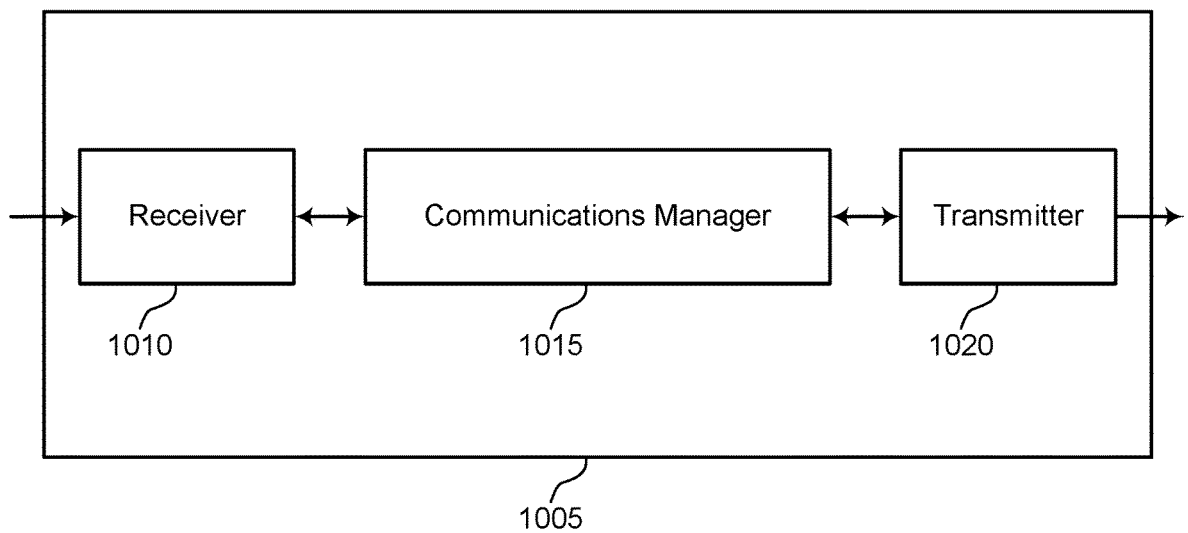
FIGS. 10 and 11 show block diagrams of devices that support UE feedback of content processing time for bi-directional traffic in accordance with aspects of the present disclosure.

FIG. 10 shows a block diagram of a device 1005 that supports UE feedback of content processing time for bi-directional traffic in accordance with aspects of the present disclosure. The device 1005 may be an example of aspects of a base station 105 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to UE feedback of content processing time for bi-directional traffic, among other examples). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit one or more downlink transmissions to a UE. The communications manager 1015 may receive, from the UE in one or more uplink transmissions, an indication of a content processing time associated with the UE processing one or more downlink signals transmitted in the one or more downlink transmissions. The communications manager 1015 may transmit downlink control information to the UE scheduling a downlink transmission and an uplink transmission in response to the downlink transmission based on the indication of the content processing time from the UE.

The communications manager 1015, or its sub-components, may be implemented in hardware, code (for example, software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at different locations, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
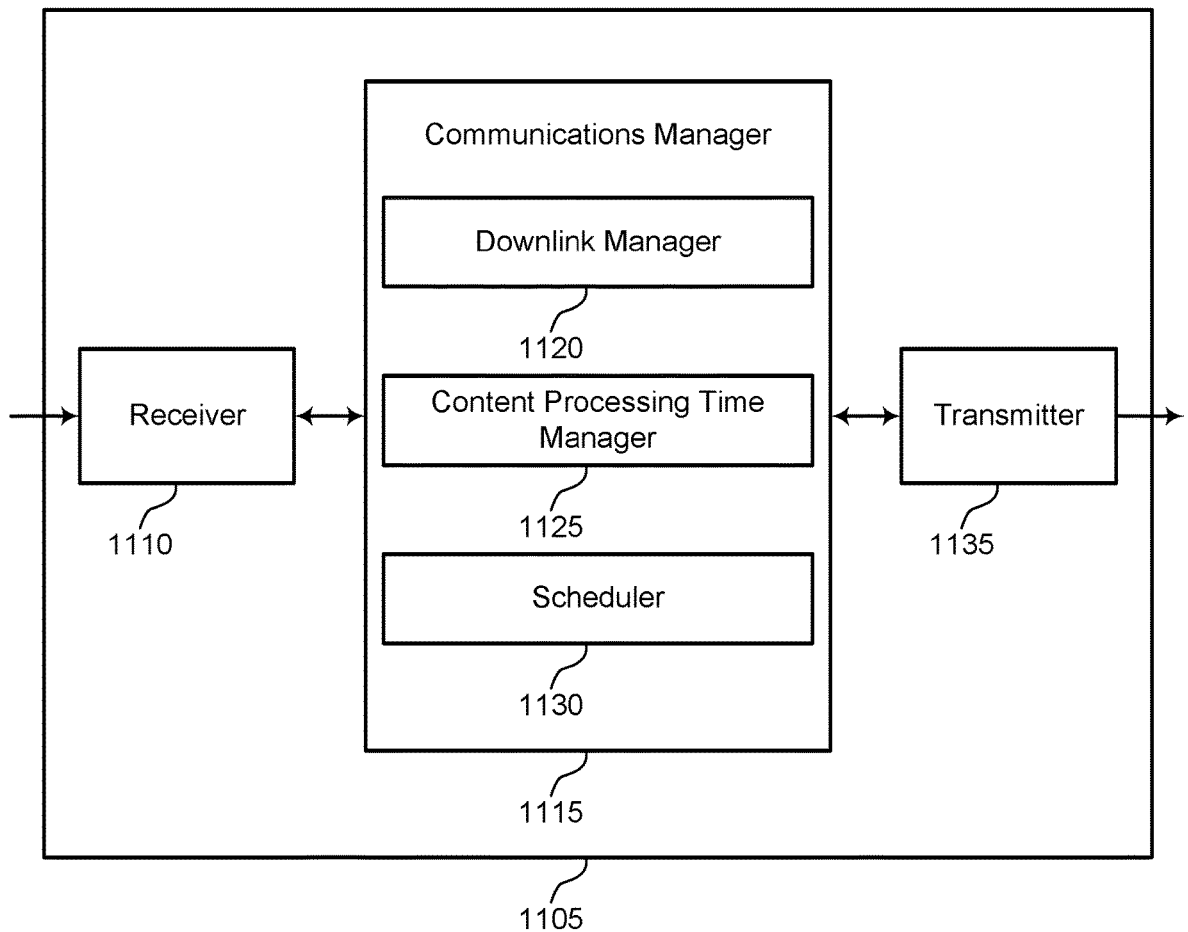

FIG. 11 shows a block diagram of a device 1105 that supports UE feedback of content processing time for bi-directional traffic in accordance with aspects of the present disclosure. The device 1105 may be an example of aspects of a device 1005, or a base station 105 as described herein. The device 1105 may include a receiver 1110, a communications manager 1115, and a transmitter 1135. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to UE feedback of content processing time for bi-directional traffic, among other examples). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may include a downlink manager 1120, a content processing time manager 1125, and a scheduler 1130.

The downlink manager 1120 may transmit one or more downlink transmissions to a UE. The content processing time manager 1125 may receive, from the UE in one or more uplink transmissions, an indication of a content processing time associated with the UE processing one or more downlink signals transmitted in the one or more downlink transmissions. The scheduler 1130 may transmit downlink control information to the UE scheduling a downlink transmission and an uplink transmission in response to the downlink transmission based on the indication of the content processing time from the UE.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
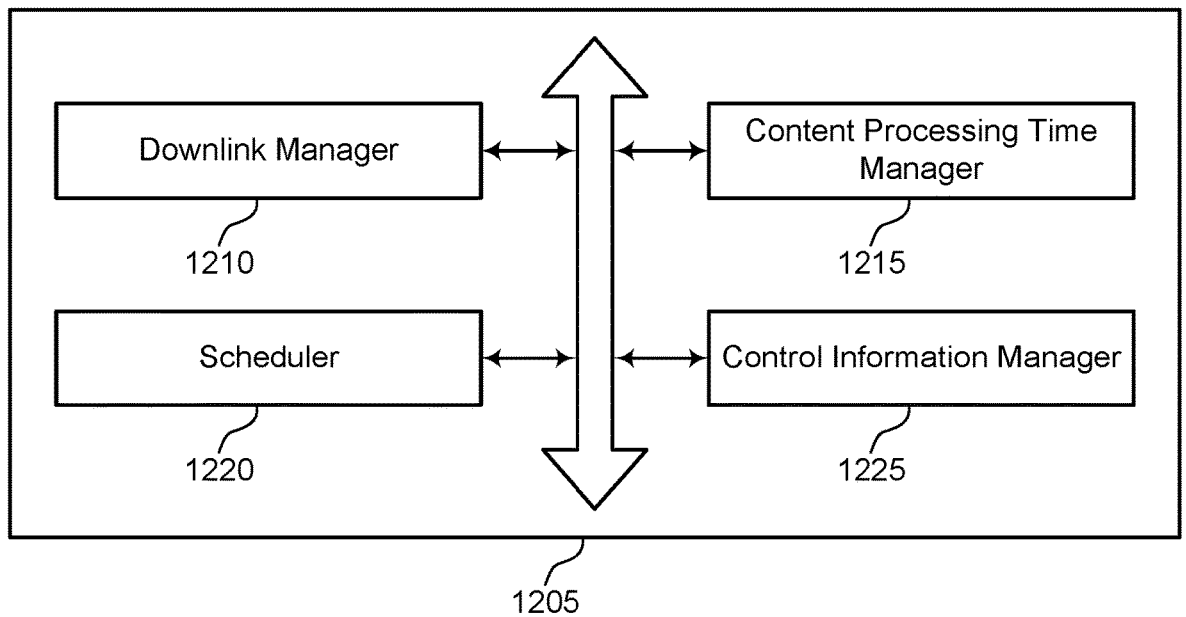
FIG. 12 shows a block diagram of a communications manager that supports UE feedback of content processing time for bi-directional traffic in accordance with aspects of the present disclosure.

FIG. 12 shows a block diagram of a communications manager 1205 that supports UE feedback of content processing time for bi-directional traffic in accordance with aspects of the present disclosure. The communications manager 1205 may include a downlink manager 1210, a content processing time manager 1215, a scheduler 1220, and a control information manager 1225. Each of these components may communicate, directly or indirectly, with one another (for example, via one or more buses).

The downlink manager 1210 may transmit one or more downlink transmissions to a UE. The content processing time manager 1215 may receive, from the UE in one or more uplink transmissions, an indication of a content processing time associated with the UE processing one or more downlink signals transmitted in the one or more downlink transmissions. The scheduler 1220 may transmit downlink control information to the UE scheduling a downlink transmission and an uplink transmission in response to the downlink transmission based on the indication of the content processing time from the UE.

In some examples, the scheduler 1220 may determine a duration of time between the downlink transmission and the uplink transmission to allocate to the UE for processing the one or more downlink signals in the downlink transmission based on the content processing time indicated by the UE, where transmitting the downlink control information to the UE scheduling the downlink transmission and the uplink transmission is based on determining the time between the downlink transmission and the uplink transmission.

In some examples, the one or more uplink transmissions include uplink control transmissions. In some examples, the indication of the content processing time is received in the one or more uplink transmissions with HARQ feedback for the one or more downlink transmissions. In some examples, the one or more uplink transmissions include uplink data transmissions. In some examples, the indication of the content processing time is received in the one or more uplink transmissions with uplink data in response to the one or more downlink transmissions.

In some examples, the content processing time manager 1215 may receive the indication of the content processing time based on the single downlink transmission. In some examples, the content processing time manager 1215 may receive the indication of the content processing time based on the set of downlink transmissions. In some examples, the content processing time manager 1215 may receive indications of a subset of a set of content processing times, each of the set of content processing times being based on a respective downlink transmission of the set of downlink transmissions.

The control information manager 1225 may transmit downlink control information configuring the UE to report the content processing time based on processing the single downlink transmission. In some examples, the control information manager 1225 may transmit the downlink control information configuring the UE to report the content processing time based on processing the set of downlink transmissions, where the reported content processing time is based on statistics of a set of processing times to process the set of downlink transmissions. In some examples, the downlink control information further indicates one or more of a periodicity for reporting content processing times or parameters for reporting the content processing times. In some examples, the parameters for reporting the content processing times include an indication of whether to report an average processing time, a maximum processing time, or a percentile of processing times to process the set of downlink transmissions. In some examples, the content processing time is further associated with the UE processing uplink signals for transmission in the one or more uplink transmissions.

Figure 13:
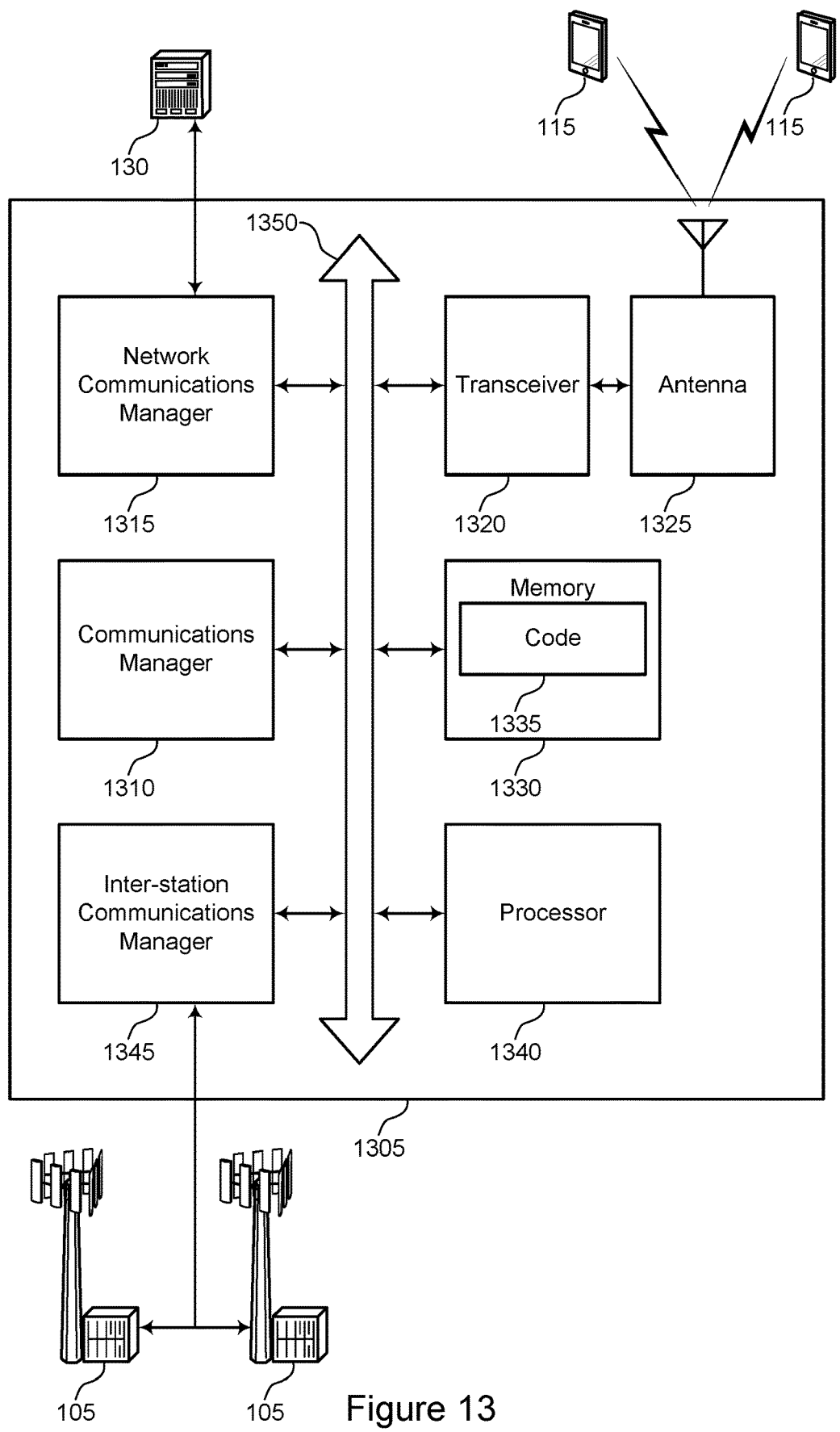
FIG. 13 shows a diagram of a system including a device that supports UE feedback of content processing time for bi-directional traffic in accordance with aspects of the present disclosure.

FIG. 13 shows a diagram of a system including a device 1305 that supports UE feedback of content processing time for bi-directional traffic in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (for example, bus 1350).

The communications manager 1310 may transmit one or more downlink transmissions to a UE. The communications manager 1310 may receive, from the UE in one or more uplink transmissions, an indication of a content processing time associated with the UE processing one or more downlink signals transmitted in the one or more downlink transmissions. The communications manager 1310 may transmit downlink control information to the UE scheduling a downlink transmission and an uplink transmission in response to the downlink transmission based on the indication of the content processing time from the UE.

The network communications manager 1315 may manage communications with the core network (for example, via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (for example, the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (for example, the memory 1330) to cause the device 1305 to perform various functions (for example, functions or tasks supporting UE feedback of content processing time for bi-directional traffic).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
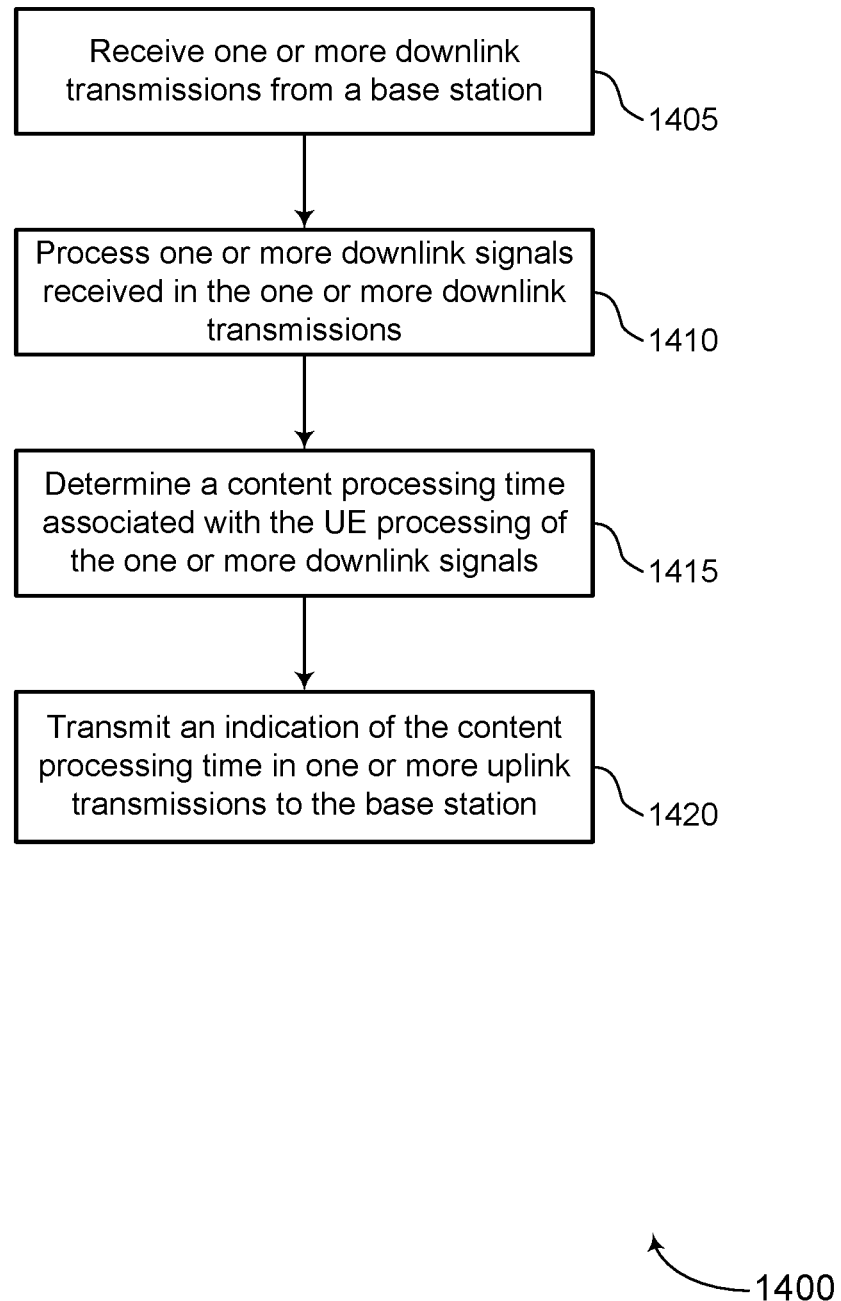
FIGS. 14 and 15 show flowcharts illustrating methods that support UE feedback of content processing time for bi-directional traffic in accordance with aspects of the present disclosure.

FIG. 14 shows a flowchart illustrating a method 1400 that supports UE feedback of content processing time for bi-directional traffic in accordance with aspects of the present disclosure. The operations of method 1400 may be implemented by a UE 115 or its components as described herein. For example, the operations of method 1400 may be performed by a communications manager as described with reference to FIGS. 6-9. In some examples, a UE may execute a set of instructions to control the functional elements of the UE to perform the functions described below. Additionally, or alternatively, a UE may perform aspects of the functions described below using special-purpose hardware.

At 1405, the UE may receive one or more downlink transmissions from a base station. The operations of 1405 may be performed according to the methods described herein. In some examples, aspects of the operations of 1405 may be performed by a downlink manager as described with reference to FIGS. 6-9.

At 1410, the UE may process one or more downlink signals received in the one or more downlink transmissions. The operations of 1410 may be performed according to the methods described herein. In some examples, aspects of the operations of 1410 may be performed by a signal processor as described with reference to FIGS. 6-9.

At 1415, the UE may determine a content processing time associated with the UE processing of the one or more downlink signals. The operations of 1415 may be performed according to the methods described herein. In some examples, aspects of the operations of 1415 may be performed by a content processing time manager as described with reference to FIGS. 6-9.

At 1420, the UE may transmit an indication of the content processing time in one or more uplink transmissions to the base station. The operations of 1420 may be performed according to the methods described herein. In some examples, aspects of the operations of 1420 may be performed by a content processing time manager as described with reference to FIGS. 6-9.

Figure 15:
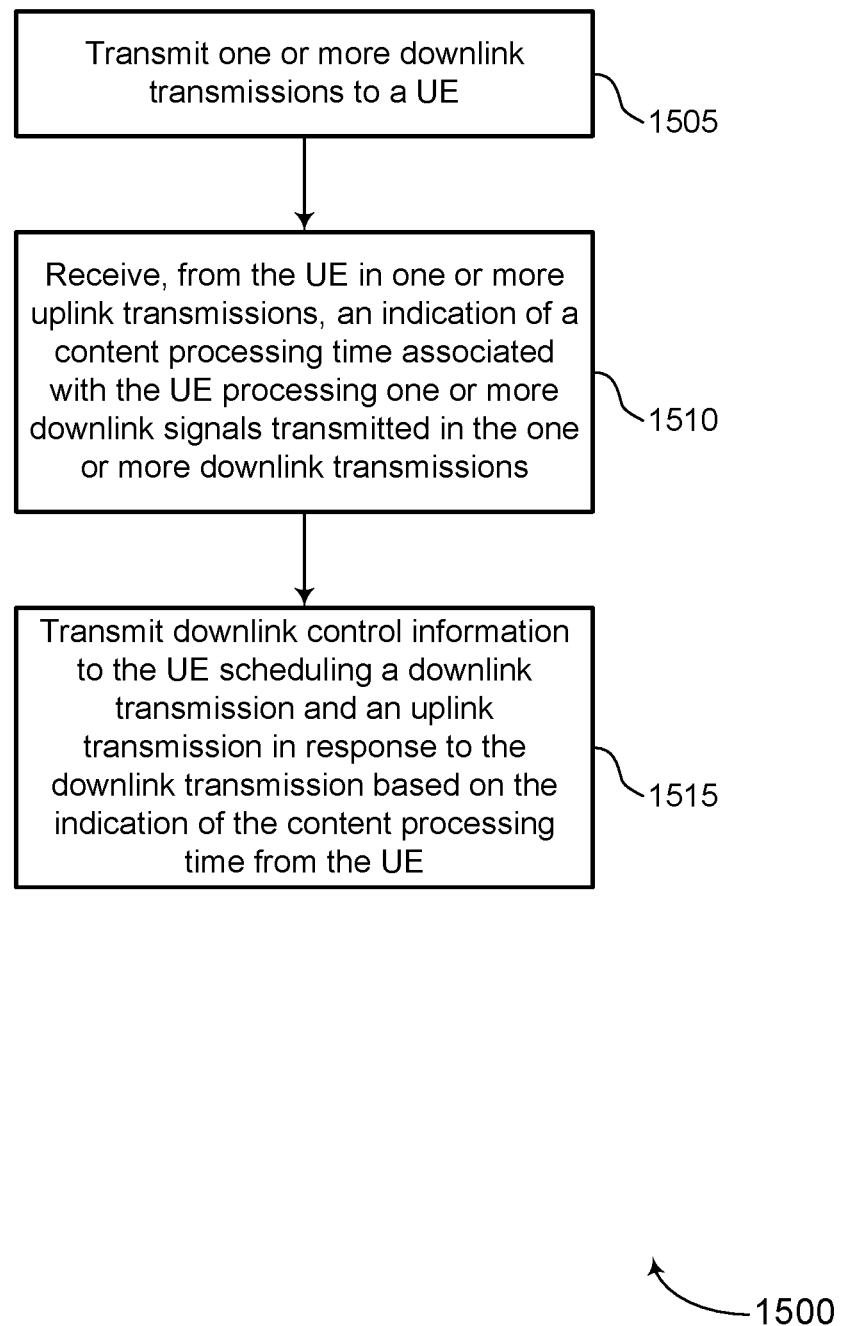

FIG. 15 shows a flowchart illustrating a method 1500 that supports UE feedback of content processing time for bi-directional traffic in accordance with aspects of the present disclosure. The operations of method 1500 may be implemented by a base station 105 or its components as described herein. For example, the operations of method 1500 may be performed by a communications manager as described with reference to FIGS. 10-13. In some examples, a base station may execute a set of instructions to control the functional elements of the base station to perform the functions described below. Additionally, or alternatively, a base station may perform aspects of the functions described below using special-purpose hardware.

At 1505, the base station may transmit one or more downlink transmissions to a UE. The operations of 1505 may be performed according to the methods described herein. In some examples, aspects of the operations of 1505 may be performed by a downlink manager as described with reference to FIGS. 10-13.

At 1510, the base station may receive, from the UE in one or more uplink transmissions, an indication of a content processing time associated with the UE processing one or more downlink signals transmitted in the one or more downlink transmissions. The operations of 1510 may be performed according to the methods described herein. In some examples, aspects of the operations of 1510 may be performed by a content processing time manager as described with reference to FIGS. 10-13.

At 1515, the base station may transmit downlink control information to the UE scheduling a downlink transmission and an uplink transmission in response to the downlink transmission based on the indication of the content processing time from the UE. The operations of 1515 may be performed according to the methods described herein. In some examples, aspects of the operations of 1515 may be performed by a scheduler as described with reference to FIGS. 10-13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), among other examples. CDMA2000 covers IS-2000, IS-95, and IS-856 standards. IS-2000 Releases may be commonly referred to as CDMA2000 1x, 1x, among other examples. IS-856 (TIA-856) is commonly referred to as CDMA2000 1xEV-DO, High Rate Packet Data (HRPD), among other examples. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, among other examples. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, among other examples) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), or UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (for example, two, three, or four) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a message indicating a configuration for reporting a single content processing time of the UE for two or more downlink transmissions;
   receiving the two or more downlink transmissions from a network entity;
   processing two or more downlink signals received in the two or more downlink transmissions; and
   transmitting an indication of the single content processing time for the two or more downlink transmissions in one or more uplink transmissions to the network entity in accordance with the configuration, the single content processing time corresponding to a function of respective content processing times for each downlink transmission of the two or more downlink transmissions.

2. The method of claim 1, further comprising receiving a downlink control information message, a radio resource control message, or a medium access control control element message indicating a change in one or more parameters of the configuration for reporting the single content processing time, wherein the indication is transmitted in accordance with the one or more parameters indicated as changed.

3. The method of claim 1, wherein the configuration includes one or more of a periodicity for reporting content processing times, a quantity of downlink transmissions of the two or more downlink transmissions, a report setting indicating a duration of a related reporting, or an indication of whether the single content processing time comprises one or more of an average processing time, a maximum processing time, or a percentile of processing times to process the two or more downlink transmissions.

4. The method of claim 3, wherein the periodicity for reporting content processing times comprises a duration of time during which the respective content processing times are to be obtained, the method further comprising:
   determining a final downlink transmission of the two or more downlink transmissions in accordance with the periodicity, wherein the indication of the single content processing time is transmitted subsequent to receiving the final downlink transmission.

5. The method of claim 1, wherein the message indicating the configuration comprises downlink control information scheduling each of the two or more downlink transmissions and each of the one or more uplink transmissions, each of the one or more uplink transmissions being in response to a respective downlink transmission of the two or more downlink transmissions.

6. The method of claim 5, wherein:
   the configuration indicates that the one or more uplink transmissions comprise uplink control transmissions; and
   the indication of the single content processing time is transmitted in a first uplink transmission of the one or more uplink transmissions with hybrid automatic repeat request feedback for at least a first downlink transmission of the two or more downlink transmissions in accordance with the configuration.

7. The method of claim 5, wherein:
   the configuration indicates that the one or more uplink transmissions comprise uplink data transmissions; and
   the indication of the single content processing time is transmitted in a first uplink transmission of the one or more uplink transmissions with uplink data in response to at least a first downlink transmission of the two or more downlink transmissions and in accordance with the configuration.

8. The method of claim 1, wherein the configuration further indicates that the UE is to report an average of the respective content processing times of the two or more downlink transmissions in accordance with the function, wherein the single content processing time comprises the average of the respective content processing times.

9. The method of claim 1, wherein the configuration indicates a quantization value associated with determining the respective content processing times, the method further comprising:
quantizing a duration of time to process each downlink signal of the two or more downlink signals received in the two or more downlink transmissions in accordance with the quantization value, wherein the respective content processing times and the single content processing time are in accordance with quantizing the duration of time to process each downlink signal of the two or more downlink signals.

10. The method of claim 9, wherein:
the quantization value comprises a quantity of slots or a quantity of symbols; and
quantizing the duration of time to process each of downlink signal of the two or more downlink signals comprises determining the quantity of slots or the quantity of symbols to process each downlink signal of the two or more downlink signals.

11. The method of claim 1, wherein the single content processing time is further in accordance with processing uplink signals for transmission in the one or more uplink transmissions.

12. The method of claim 1, wherein a content processing time of the respective content processing times comprises a duration of time to process at least one of the two or more downlink transmissions.

13. A user equipment (UE), comprising:
a processing system that includes processor circuitry and memory circuitry that stores code, the processing system configured to cause the UE to:
receive a message indicating a configuration for reporting a single content processing time of the UE for two or more downlink transmissions;
receive the two or more downlink transmissions from a network entity;
process two or more downlink signals received in the two or more downlink transmissions; and
transmit an indication of the single content processing time for the two or more downlink transmissions in one or more uplink transmissions to the network entity in accordance with the configuration, the single content processing time corresponding to a function of respective content processing times for each downlink transmission of the two or more downlink transmissions.

14. The UE of claim 13, wherein the processing system is further configured to cause the UE to receive a downlink control information message, a radio resource control message, or a medium access control control element message indicating a change in one or more parameters of the configuration for reporting the single content processing time, wherein the indication is transmitted in accordance with the one or more parameters indicated as changed.

15. A method for wireless communication at a network entity, comprising:
transmitting, to a user equipment (UE), a message indicating a configuration for reporting a single content processing time of the UE for two or more downlink transmissions;
transmitting the two or more downlink transmissions to the UE;
receiving, from the UE in one or more uplink transmissions, an indication of the single content processing time for the two or more downlink transmissions in accordance with the configuration, the single content processing time corresponding to a function of respective content processing times for each downlink transmission of the two or more downlink transmissions; and
transmitting downlink control information to the UE scheduling a downlink transmission and an uplink transmission in response to the downlink transmission in accordance with the indication of the single content processing time from the UE.

* * * * *